March 4, 1952  A. N. NEERGAARD ET AL  2,588,277
CONDITIONING MACHINE
Filed May 7, 1947
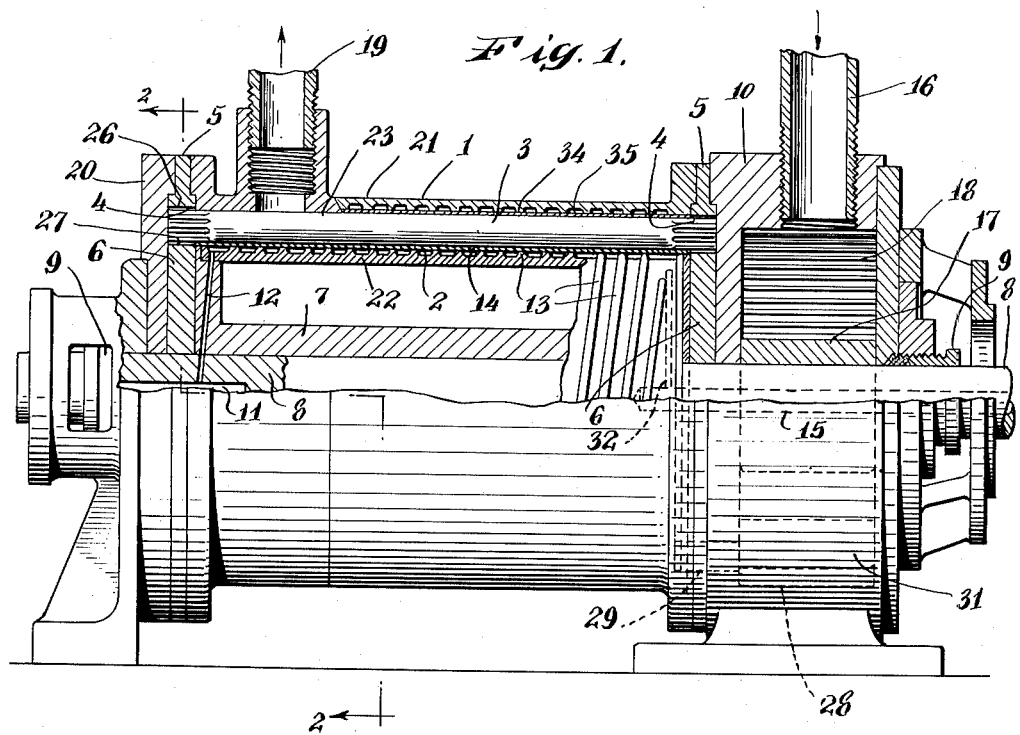
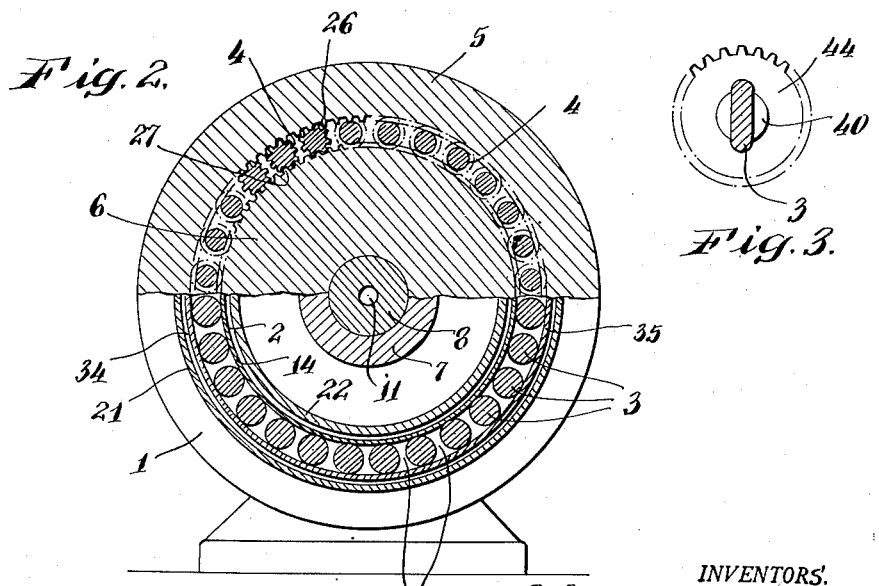
INVENTORS.
Anders Nikolaj Neergaard
Axel Christian Steenberg
By: Haseltine, Lake & Co.,
AGENTS.

Patented Mar. 4, 1952

2,588,277

UNITED STATES PATENT OFFICE 2,588,277

CONDITIONING MACHINE

Anders Nikolaj Neergaard and Axel Christian Steenberg, Copenhagen, Denmark

Application May 7, 1947, Serial No. 746,480
In Denmark May 18, 1946

2 Claims. (Cl. 257—89)

The invention relates to an apparatus for conditioning the temperature of chocolate and the like temperature sensitive masses at their passage from the processing stage to the casting or molding stage.

The object of the invention thus is an apparatus by means of which the temperature of the mass to be cast is set and controlled or "conditioned" so that the chocolate or other mass which leaves the processing stage at a relatively high temperature is cooled down during a period of time as short as possible to the proper casting temperature and is fed to the casting or molding machine without the consistency or the quality of the chocolate or other mass to be treated being adversely affected.

The apparatus of the invention will be dimensioned in accordance with the capacity of the plant in which the apparatus is to be employed. The temperature determining liquid or fluid passed through the conditioning apparatus will be so chosen and regulated as to its heat conducting and transferring characteristics, its velocity, quantity and temperature, that a suitable, gradual and even decrease of the temperature in every part throughout the apparatus is obtained and the chocolate or other mass will leave the apparatus with the desired casting or molding temperature.

A further object of the invention is to provide a temperature conditioning apparatus which occupies comparatively little space, is capable of being started and stopped rapidly, and when being stopped with chocolate in it without the risk that the chocolate would congeal, an apparatus thus which ensures the rapid passage of the chocolate therethrough in intimate contact with the temperature conditioning surfaces whilst fairly free control of the speed with which the chocolate or other mass passes through the apparatus is made possible.

In order to achieve these and other objects and purposes, the apparatus of the invention in its principal features includes a chamber constituted by a pair of parallel surfaces, in the preferred embodiment of the invention, a pair of concentric cylinders confining between them an annular cylindrical chamber, through which chamber the chocolate or other temperature sensitive mass is passed while being conveyed from the processing stage to the molding or casting stage. In close proximity to one of the surfaces or to both, a jacket is provided to which a temperature conditioning agent or fluid is supplied through an appropriate entry port and from which the fluid will be discharged through an appropriate discharge port. Within the chamber there are disposed bars extended longitudinally of the chamber and of a width substantially equal the width of the chamber. These bars may be of roller form or in the form of flat blades, with plane or curved lateral faces and rounded edges, and they may be provided with any checkered rough, or smooth surfaces. They will be driven by appropriate gearing so as to rotate and simultaneously to move transversely of the annular cylindrical chamber in planetary movement. The bars will then alternatingly spread the mass upon, and scrape it from, the chamber surfaces whilst moving the mass transversely of the chamber or peripherally thereof.

In this way, the bars are operative essentially for producing the intimate contact between the conditioning surfaces and the mass with the result that all particles of the mass will be thoroughly and accurately brought to the desired temperature. The speed of the passage of the mass through the apparatus or its movement in the longitudinal direction of the machine and thus the average time during which a particle stays in the machine may within the widest imaginable limits be controlled continually by adjusting the pressure difference between the intake side and the discharge side. The rollers might be guided at their ends in bearings so as to remain evenly distributed over the hollow space, or chamber, without any special driving gear, since they are driven about by the friction with the conditioning surfaces and the mass. However, to ensure a uniform treatment of the chocolate or other mass, the rollers or bars, as more specifically described hereinafter, may be driven at a uniform motion about their own axes.

In an embodiment of the invention hereinafter more specifically described, one of the temperature conditioning surfaces is rotated. The rollers will then be driven simply by providing motion transmitting members or appropriate gearing, more particularly planetary gearing between the moving cylindrical surface, the stationary cylindrical surface and the rollers, which gearing will then drive the rollers or bars when the cylindrical surface is rotated.

The pressure difference, mentioned above, between the intake side and the discharge side of the apparatus, which serves the purpose of conveying the chocolate mass through the apparatus, can of course be provided and adjusted in several ways, which in themselves do not concern the arrangement of the conditioning machine. However, there is a specific way for this arrangement associated with the arrangement of the machine.

The temperature conditioning chamber, containing the rollers or bars, may at its intake side communicate directly with the delivery side of a gear pump, which then has its end plate in common with the temperature conditioning apparatus. This end plate is perforated opposite the zone where during the operation of the apparatus the approximately hour-glass shaped spaces between the rollers and surfaces are formed.

When the inner conditioning surface is rotatable, its cylinder may, according to a development of the invention, be integral with, or rigidly connected to, the centrally situated driving wheel of the pump, an extremely simple and tightly constructed unit thus resulting. The shaft of the driving wheel may then further be provided with central passages for the admission of the temperature conditioning fluid to, and the discharge from, a jacket arranged in close proximity to, or underneath, the inner cylindrical surface of the temperature conditioning apparatus, admission and discharge of the liquid to the movable jacket thus being extremely simple.

To ensure a gradual and even reduction of the temperature in the longitudinal extension of the apparatus, the jacket of the inner cylinder, and if a jacket is also provided at the outer conditioning surface or cylinder, this jacket likewise, has its space formed as a helix close to the conditioning surface. The jacket or jackets may then, according to this development of the invention, be made of a drum with a helical ridge, above which a thin-walled cylinder, preferably made of metal sheets, is placed. Through this helical jacket the conditioning liquid will be passed at a very high speed ensuring thus a gradual and even reduction of the temperature along the length of the apparatus. Thus any required cooling effect can be obtained, and owing to the thin wall of the jacket the heat can be withdrawn quickly from the chocolate mass. The apparatus may be stopped without being emptied of chocolate, only, when the apparatus is stopped, the jacket should be coupled with the heating jackets of the chocolate chambers. The chocolate in the apparatus thus will remain liquid until the machine is started anew and is coupled with its normal conditioning or cooling liquid pipes. The chocolate will then quickly assume the normal casting consistency in the discharge pipe. Since a chocolate particle on an average will remain for a little less than one minute in this machine, not more than two minutes will pass after the starting, before the chocolate mass leaves the machine with a perfectly normal casting temperature and consistency. During these two minutes or so the chocolate is rather too warm, but this is, if anything, an advantage, because it will equalize the losses of heat in the discharge pipe during the stoppage of the machine.

For further illustration of our invention, reference is now made to the accompanying drawings which form part of this specification and in which:

Fig. 1 is an elevation, partly in section, of an embodiment of the invention;

Fig. 2 is a section along line 2—2 of Fig. 1;

Fig. 3 is a section of a modification of a revolving bar.

The conditioning apparatus consists of an outer cylinder 21 with jacket 1 and an inner cylinder 22 with jacket 2, which are shaped as co-axial cylinders, confining between them the temperature conditioning chamber 23. In this chamber 23, between the cylinders, several bars 3 are placed which as in the embodiment of Figs. 1 and 2 may be cylindrical rollers, or as illustrated in Fig. 3 flat blades with rounded edges, or may be of any other appropriate form. The diameters of the bars or rollers correspond to the width of the chamber 23, as best will be seen on the lower part of Fig. 2.

At each end of the rolls 3 teeth 4 are cut, which form a pinion or planet gear meshing with the rim 26 of the internal gear 5 and the rim of the spur gear 6 mounted on the shaft 8 of the apparatus.

Shaft 8 also carries a drum 7 on which jacket 2 is arranged. Shaft 8 is packed liquid-tight in bearings 9 at each of its ends.

On rotation of the shaft 8 the rim of spur gear 6 will cause the rollers 3 to move through chamber 23 between the jackets 1 and 2 at the same time as the rollers rotate about their own axes. The jacket 1 is secured to the gear rims 5, which in turn are secured to the stationary endpieces 10 and 20.

The shaft 8 is provided with bores 11 and 15 at its ends, which through side ducts 12 and 32, respectively, communicate with a space, filled with liquid, in the jacket 2. This jacket is formed in a drum provided with ribs 13, which are covered by a thin plate cylinder 14. The ribs 13 form a continuous helical line with the result that the conditioning liquid supplied through the hollow passage of the shaft 8 will pass through the jacket 2 along a helical course.

Then the conditioning liquid escapes through the other side passage 32 to the central passage 15 at the other end of the shaft 8. The jacket 1 is made in the same way as the jacket 2, consisting of helical rib 34 and cylindrical cover 35, but it is not absolutely necessary for the satisfactory working of the machine that both of the jackets are cooled.

The chocolate mass which is to be conditioned in the apparatus is fed through a pipe 16 to a gear pump, generally designated by 31, in which the chocolate mass is conveyed among the teeth of two gear wheels, one, 17, of which is attached to the shaft 8, whereas the other, 18, is in engagement with it and altogether situated behind the plane of the drawing. Hereby the chocolate mass is pumped down into a pressure chamber, indicated in broken lines at 28, in the gear pump below the gear wheels, and from there the mass is pressed through holes as indicated at 29, in the end wall 10 opposite the hollow space between the cylinders 14 and 35, whereby the mass will be pressed into the chamber 23 between the rollers 3 or other bars. Here the temperature conditioning or cooling of the chocolate mass takes place, the chocolate mass being pressed by the rollers 3 or bars against the cylinders 14 and 35 and thus being spread in thin layers upon the cylinders and immediately afterwards being scraped off again, while new layers are spread upon the cylinders. In this way a direct transmission of heat from the conditioned jacket or jackets to each individual particle in the chocolate mass is achieved. The mass thus is cooled down rapidly to the desired temperature. Owing to the pressure produced in the gear pump the chocolate mass is pressed through the conditioning chamber, the mass being discharged from the chamber through a pipe 19, which opens into the discharge end of the chamber.

To maintain an even reduction of the temperature over the conditioning jacket it is essential that the conditioning liquid moves quickly through the jacket, and this purpose is served by the helical liquid-space in the jacket. For if a particularly intense heating occurs in certain sections of the jackets, fresh cooling liquid will soon flow forwards through the windings of liquid-space to the said sections with the result that the temperature at any one point of the jacket can remain relatively constant regardless of the fluctuations which continually occur in the heat transmission at the point in question.

At the end of the gear pump a speed gear mechanism, which is driven by an electromotor or some other source of power, may be arranged, not shown on the drawings.

The conditioning machine may be made in many other ways than that shown, without departing from the spirit and scope of the invention.

Thus either of the jackets 1 and 2 may be stationary, while the rolls 3 alone, driven by the planetary gearing as described with reference to Figs. 1 and 2, move about in the intermediate space between the two jackets. Further, as described hereinabove, the rolls may be replaced by scrapers or other bodies moving about in the intermediate space or conditioning chamber 23 between the two jackets without imparting any component of motion to the chocolate mass in the axial direction of the machine. The movement of the chocolate mass in the said direction is regulated exclusively by means of the pressure difference in the pipes 16 and 19.

Having now described our invention, what we claim as new and desire to secure by Letters Patent, is:

1. Apparatus for conditioning the temperature of chocolate and the like temperature sensitive masses at their passage from the processing stage to the casting stage, said apparatus comprising a pair of concentric cylinders confining an annular chamber therebetween, means being associated with at least one of said cylinders for supplying a temperature conditioning agent thereto, means for supplying said mass under pressure to said annular chamber at the one end and withdrawing said mass at the other end of said chamber; bars axially disposed in said annular chamber and extending longitudinally thereof, said bars being of a width substantially equal to the width of said annular chamber; and gearing associated with said bars for imparting to said bars a planetary motion within said annular chamber, said bars being adapted for alternatingly spreading said mass upon, and scraping it from the surfaces of said annular chamber whilst moving it peripherally thereof, one of said cylinders being rotatable and said gearing including planetary gears at least at one end of said bars, an internal gear mounted at the corresponding end of the outer of said cylinders and a spur gear mounted at the corresponding end of the inner of said cylinders, said planetary gear meshing with both said internal gear and said spur gear thereby to impart to said bars a planetary motion within said annular chamber when said rotatable cylinder is in motion.

2. Apparatus for conditioning the temperature of chocolate and the like temperature sensitive masses at their passage from the processing stage to the casting stage, said apparatus comprising a pair of concentric cylinders confining an annular chamber therebetween, means being associated with at least one of said cylinders for supplying a temperature conditioning agent thereto, means for supplying said mass under pressure to said annular chamber at the one end and withdrawing said mass at the other end of said chamber; bars axially disposed in said annular chamber and extending longitudinally thereof, said bars being of a width substantially equal to the width of said annular chamber; and gearing associated with said bars for imparting to said bars a planetary motion within said annular chamber, said bars being adapted for alternatingly spreading said mass upon, and scraping it from the surfaces of said annular chamber whilst moving it peripherally thereof, a rotary shaft, said inner cylinder being mounted on said shaft, said means for supplying said mass under pressure including a gear pump, the central driving wheel of said gear pump being mounted on said rotary shaft; said means for supplying a temperature conditioning agent to at least one of said cylinders including a jacket associated with said inner cylinder in close proximity to its surface, said jacket having an entry port and a discharge port at the ends of said cylinder; and said shaft having central bores at both its ends communicating with one of said ports each for respectively supplying and discharging a temperature conditioning fluid through said ports and passing it through said jacket.

ANDERS NIKOLAJ NEERGAARD.
AXEL CHRISTIAN STEENBERG.

REFERENCES CITED

The following references are of record in the file of this patent:

UNITED STATES PATENTS

| Number | Name | Date |
|---|---|---|
| Re. 22,519 | Miller | July 18, 1944 |
| 302,817 | Bailey | July 29, 1884 |
| 799,990 | Knapp | Sept. 19, 1905 |
| 1,076,924 | Thurmann | Oct. 28, 1913 |
| 1,405,584 | Hardy | Feb. 7, 1922 |
| 1,471,697 | Kubes | Oct. 23, 1923 |
| 1,583,333 | Bigum | May 4, 1926 |
| 1,620,702 | Thurmann | Mar. 15, 1927 |
| 1,656,164 | Bragard | Jan. 17, 1928 |
| 1,769,803 | Stancliffe | July 1, 1930 |
| 1,774,464 | Wood | Apr. 26, 1930 |
| 1,868,436 | Stancliffe | July 19, 1932 |
| 1,891,165 | Knupffer | Dec. 13, 1932 |
| 2,001,085 | Walter | May 14, 1935 |
| 2,055,956 | Wells | Sept. 29, 1936 |
| 2,070,558 | Beck | Feb. 16, 1937 |
| 2,355,539 | Lawton | Aug. 9, 1944 |
| 2,389,242 | Spanel | Nov. 20, 1945 |